(12) United States Patent
Lee

(10) Patent No.: US 7,558,552 B1
(45) Date of Patent: Jul. 7, 2009

(54) INTEGRATED CIRCUIT AND METHOD OF GENERATING A BIAS CURRENT FOR A PLURALITY OF DATA TRANSCEIVERS

(75) Inventor: Thomas Anthony Lee, Lakeville, MN (US)

(73) Assignee: XILINX, Inc., San Jose, CA (US)

( * ) Notice: Subject to any disclaimer, the term of this patent is extended or adjusted under 35 U.S.C. 154(b) by 965 days.

(21) Appl. No.: 10/993,607

(22) Filed: Nov. 19, 2004

(51) Int. Cl.
H04B 1/06 (2006.01)

(52) U.S. Cl. ............... 455/259; 455/127.1; 455/169.1; 455/195.1; 375/219; 375/354; 327/141

(58) Field of Classification Search ............... 455/259, 455/127.1, 169.1, 195.1; 375/219, 354, 355; 327/141–148
See application file for complete search history.

(56) References Cited

U.S. PATENT DOCUMENTS

| | | | | | |
|---|---|---|---|---|---|
| 5,347,177 | A | * | 9/1994 | Lipp | 326/30 |
| 5,512,814 | A | * | 4/1996 | Allman | 323/267 |
| 5,559,425 | A | * | 9/1996 | Allman | 323/315 |
| 5,739,681 | A | * | 4/1998 | Allman | 323/314 |
| 5,812,595 | A | * | 9/1998 | Jandu | 375/219 |
| 6,298,255 | B1 | * | 10/2001 | Cordero et al. | 600/372 |
| 6,529,563 | B1 | * | 3/2003 | Mosinskis et al. | 375/317 |
| 6,549,310 | B1 | * | 4/2003 | Kuchta et al. | 389/16 |
| 6,876,249 | B2 | * | 4/2005 | Maigret et al. | 327/539 |
| 7,218,168 | B1 | * | 5/2007 | Rahman | 327/540 |
| 7,224,904 | B1 | * | 5/2007 | Giaretta et al. | 398/135 |
| 7,295,618 | B2 | * | 11/2007 | Hsu et al. | 375/257 |
| 7,295,750 | B2 | * | 11/2007 | Ekkizogloy et al. | 385/147 |
| 7,406,118 | B2 | * | 7/2008 | Groen et al. | 375/219 |
| 2004/0047376 | A1 | * | 3/2004 | Shapiro et al. | 372/38.02 |
| 2004/0067060 | A1 | * | 4/2004 | Aronson et al. | 398/135 |
| 2004/0093529 | A1 | * | 5/2004 | Devlin et al. | 713/300 |
| 2004/0114649 | A1 | * | 6/2004 | Asuri et al. | 372/38.02 |
| 2004/0136422 | A1 | * | 7/2004 | Mahowald et al. | 372/38.02 |
| 2004/0192362 | A1 | * | 9/2004 | Vicari | 455/507 |
| 2005/0057580 | A1 | * | 3/2005 | Yamano et al. | 345/690 |
| 2005/0088201 | A1 | * | 4/2005 | Devlin et al. | 326/38 |
| 2006/0120202 | A1 | * | 6/2006 | Kim et al. | 365/230.06 |

(Continued)

OTHER PUBLICATIONS

U.S. Appl. No. 10/618,404, filed Jul. 11, 2003, Young.

(Continued)

Primary Examiner—Matthew D Anderson
Assistant Examiner—Minh D Dao
(74) Attorney, Agent, or Firm—John J. King; Thomas George

(57) ABSTRACT

Various embodiments of the present invention relate to circuits for and methods of generating a bias current for a plurality of data transceivers on an integrated circuit. According to one embodiment, an integrated circuit having a plurality of data transceivers comprises a first data transceiver receiving a reference voltage. A plurality of data transceivers are preferably coupled to the first data transceiver, where each the data transceiver of the plurality of data transceivers receives a reference current based upon the reference voltage from the first data transceiver. According to alternate embodiment of the invention, an external resistor is coupled to a data transceiver to generate a fixed bias current in addition to a variable bias current. A method of generating a bias current for a plurality of data transceivers is also disclosed.

32 Claims, 7 Drawing Sheets

U.S. PATENT DOCUMENTS

| | | | |
|---|---|---|---|
| 2006/0170451 A1* | 8/2006 | Jordanger et al. | 326/34 |
| 2007/0013428 A1* | 1/2007 | Vadi et al. | 327/293 |
| 2007/0035330 A1* | 2/2007 | Young | 326/41 |
| 2007/0042722 A1* | 2/2007 | Kim | 455/73 |
| 2007/0142080 A1* | 6/2007 | Tanaka et al. | 455/552.1 |
| 2008/0126587 A1* | 5/2008 | Dybsetter | 710/11 |
| 2008/0137721 A1* | 6/2008 | Hsu et al. | 375/231 |

OTHER PUBLICATIONS

U.S. Appl. No. 10/661,016, filed Sep. 11, 2003, Groen et al.
U.S. Appl. No. 10/683,944, filed Oct. 10, 2003, Young.
U.S. Appl. No. 10/836,722, filed Apr. 30, 2004, Vadi et al.
U.S. Appl. No. 10/993,583, filed Nov. 19, 2004, Lee.
U.S. Appl. No. 10/993,863, filed Nov. 19, 2004, Lee et al.
U.S. Appl. No. 10/993,886, filed Nov. 19, 2004, Lee.

* cited by examiner

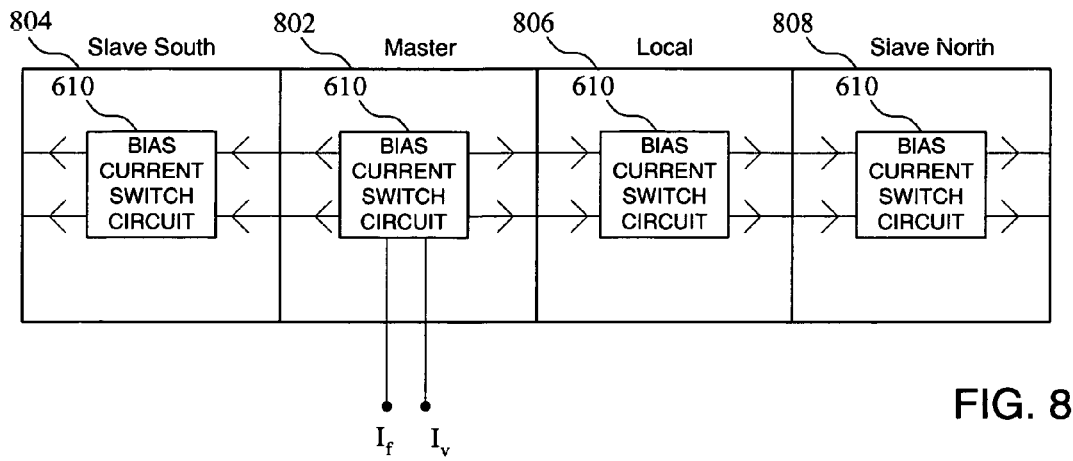
FIG. 8
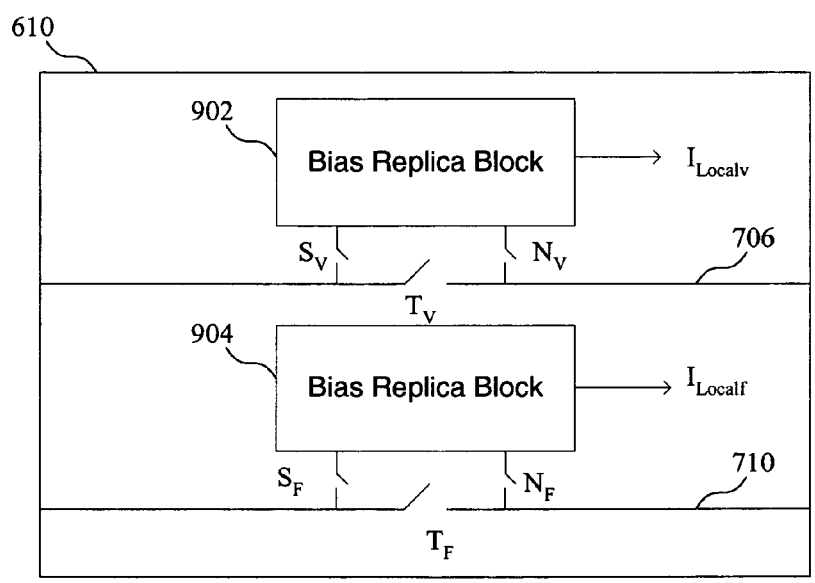
FIG. 9
| Bias Circuit | S Switch State | N Switch State | S I/O Function | N I/O Function | T Switch State |
|---|---|---|---|---|---|
| MASTER | CLOSED | CLOSED | OUTPUT | OUTPUT | OPEN |
| SLAVE SOUTH | CLOSED | CLOSED | OUTPUT | INPUT | OPEN |
| SLAVE NORTH | CLOSED | CLOSED | INPUT | OUTPUT | OPEN |
| LOCAL | OPEN | OPEN | N/A | N/A | CLOSED |
FIG. 10

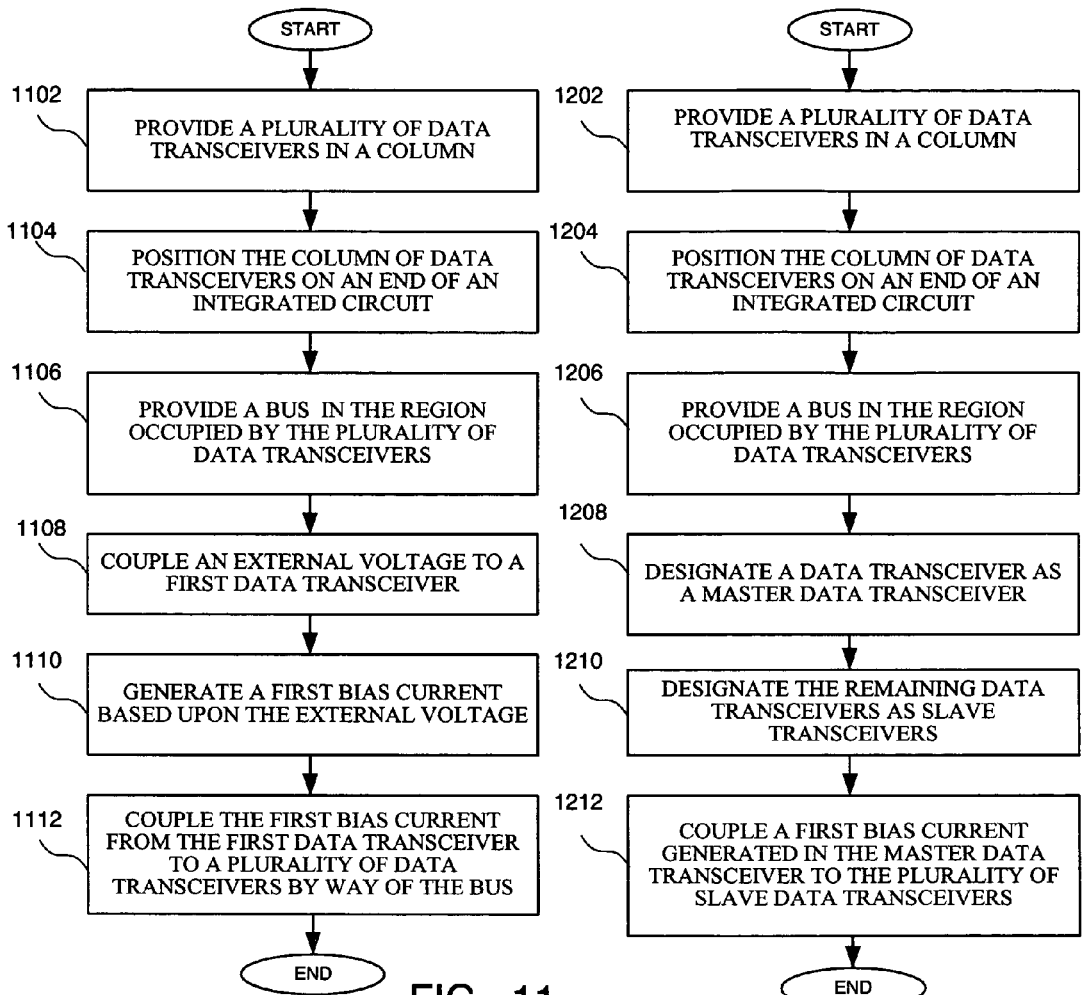

US 7,558,552 B1

INTEGRATED CIRCUIT AND METHOD OF GENERATING A BIAS CURRENT FOR A PLURALITY OF DATA TRANSCEIVERS

FIELD OF THE INVENTION

The present invention relates generally to integrated circuits, and in particular, to an integrated circuit having a plurality of data transceivers, and a method of generating a bias current for a plurality of data transceivers on an integrated circuit.

BACKGROUND OF THE INVENTION

Within electronic circuits or systems, communication takes place at various levels and distances, including on an integrated circuit (IC), within a printed circuit board (PCB) or card, between PCBs within a chassis, and between equipment or chassis. The transfer of data, such as between integrated circuits or between cards on a backplane, is often required in a digital system design. Transferring data by way of a serial communications channel has become increasingly important. Serial communications channels make greater use of the available resources, such as the number of pins used to transfer data. System interface standards address increasing bandwidth requirements between IC components, line cards, and systems. However, as data rates exceed 1 Gbps, new challenges arise for system designers. Numerous technology advancements and capabilities are associated with current advanced serial interfaces. To successfully design and deploy products using multi-gigabit serial links, the signaling channel must be carefully designed with the aid of high-accuracy channel simulation models.

One of the most important advantages of serial interface technologies is cost reduction. While cost premiums may be acceptable for a short time, long-term cost advantages are necessary to ensure that a given technology will be adopted and supported. Even at high performance levels, serial interfaces help reduce connector costs, package costs, and possibly board costs. High speed I/O and connectivity allow digital systems to achieve breakthrough performance processing. Accordingly, serial interfaces will result in better performance scalability, interconnect density, pin count reduction, cost containment, and greater capacity.

As data transfer speeds have increased, high-speed differential serial lines have replaced large parallel buses in many designs. A Serializer/Deserializer (SERDES) converts parallel data into differential serial data, and differential serial data into parallel data. While parallel interfaces will remain essential to the core of traditional monolithic uniprocessor or multiprocessor platforms, many other I/O grade interfaces will become serial. Recently, serial interconnect technologies have matured to enable high-speed switched architectures with excellent performance and scalability, as well as low pin counts and cost. Clock speeds have increased from 33-133 MHz using parallel connectivity, to 2-10 GHz using serial connectivity.

Signal integrity is critical for data throughput in high speed serial channels. A bias current is necessary to operate data transceivers in an integrated circuit. Conventional integrated circuits employing data transceivers can suffer from reduced yield without a stable bias current. However, employing external bias pins for each data transceiver can be costly in terms of pin count, board space and component cost. Accordingly, there is a need for an improved integrated circuit having data transceivers and method of method of generating a bias current for a plurality of data transceivers on an integrated circuit.

SUMMARY OF THE INVENTION

Various embodiments of the present invention relate to circuits for and methods of generating a bias current for a plurality of data transceivers on an integrated circuit. According to one embodiment, an integrated circuit having a plurality of data transceivers comprises a first data transceiver receiving a reference voltage. The other data transceivers are preferably coupled to the first data transceiver, where each data transceiver receives a reference current based upon the reference voltage from the first data transceiver. According to alternate embodiment of the invention, an external resistor is coupled to a data transceiver to generate a fixed bias current in addition to a variable bias current. According to another aspect of the invention, switches are used in the data transceivers to couple the fixed or variable bias currents to an adjacent data transceiver.

Methods of generating bias currents in a circuit having a plurality of data transceivers are also disclosed. According to one embodiment, a method of generating a bias current for a plurality of data transceivers comprises steps of providing a master data transceiver; coupling a plurality of slave data transceivers to the master data transceiver by way of a bus; and coupling a first reference current generated in the master data transceiver to the plurality of slave data transceivers. Steps of coupling an external resistor to a data transceiver to generate a fixed bias current in addition to a variable bias current are also disclosed. Coupling fixed or variable bias currents to adjacent data transceivers by way of switches is also disclosed.

BRIEF DESCRIPTION OF THE DRAWINGS

FIG. 8 is a block diagram of a circuit for routing bias currents according to an embodiment of the present invention;

FIG. 9 is a block diagram of a circuit for coupling bias currents to adjacent data transceivers according to an embodiment of the present invention;

FIG. 10 is a table showing switch settings for a circuit for coupling bias currents according to an embodiment of the present invention;

FIG. 11 is a flow chart showing a method of generating a bias current according to an embodiment of the present invention;

FIG. 12 is a flow chart showing a method of coupling bias currents according to an embodiment of the present invention;

DETAILED DESCRIPTION OF THE DRAWINGS

Figure 1:
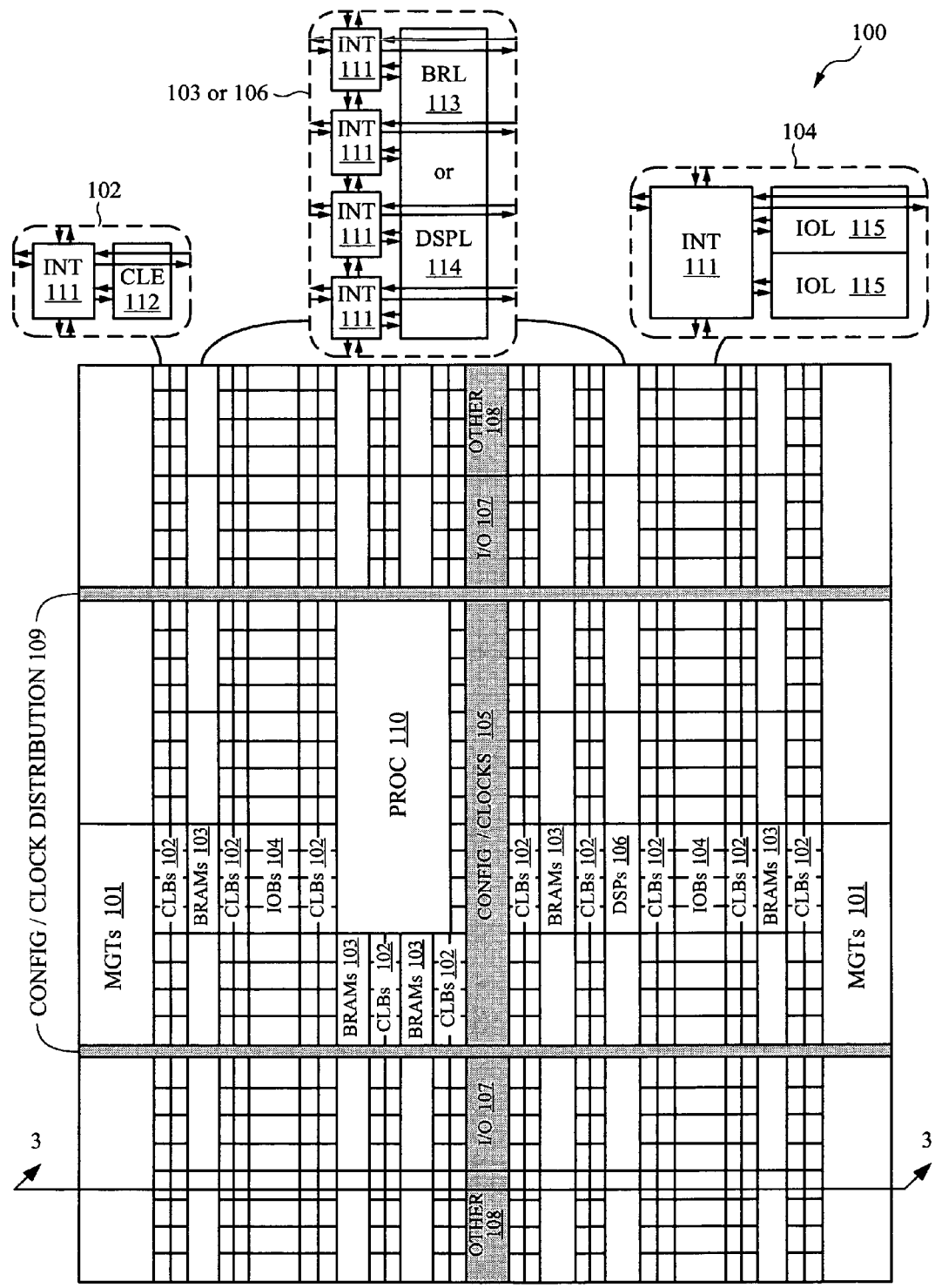
FIG. 1 is a plan view of an integrated circuit showing the arrangement of circuit elements implementing embodiments of the present invention.

Turning first to FIG. 1, a block diagram of a circuit for implementing circuit and methods for enabling transferring data according to an embodiment of the present invention is shown. In particular, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Similarly the circuits and methods of the present invention could be implemented in any device, including any type of programmable logic device, having memory.

Figure 2:
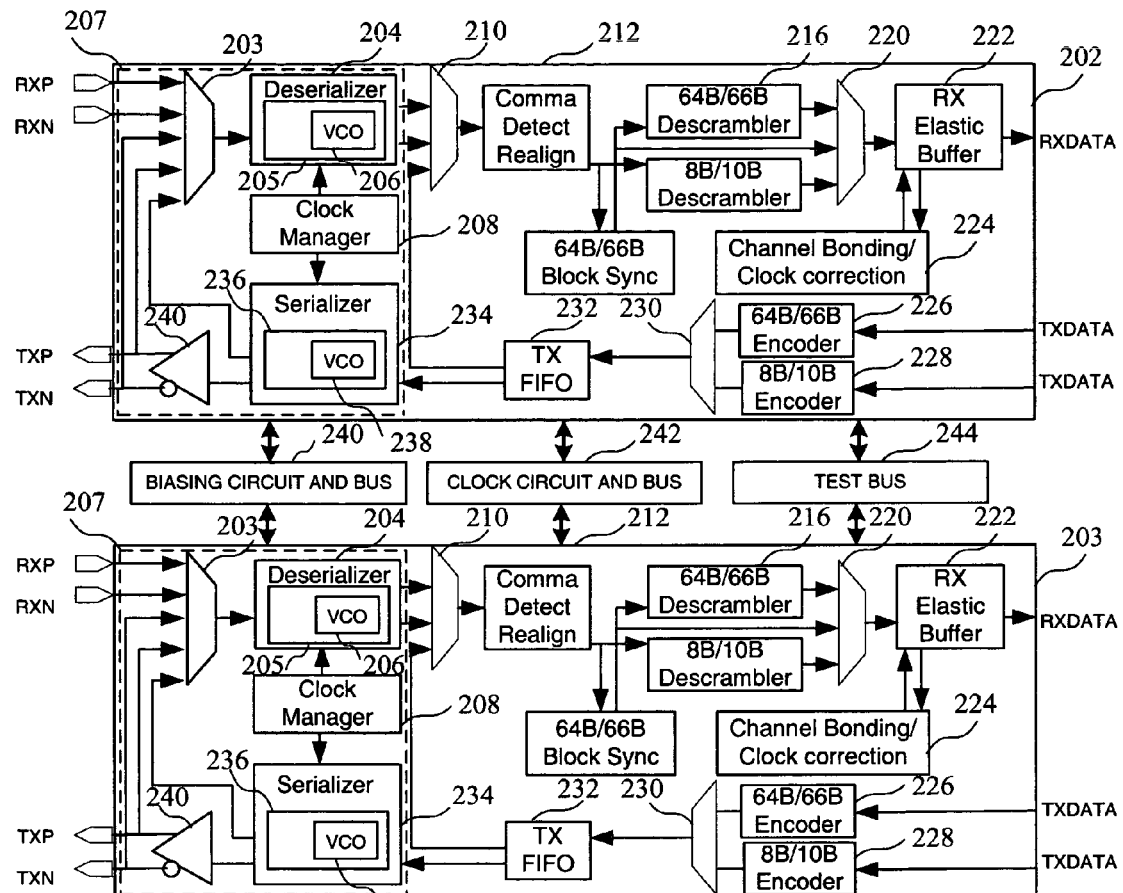
FIG. 2 is a block diagram of a data transceiver pair and associated buses according to an embodiment of the present invention.

Turning now to FIG. 2, a block diagram of a data transceiver pair and associated buses according to an embodiment of the present invention is shown. Because the MGT pair comprises identical data transceivers 202 and 203 (also called multi-gigabyte transceivers or MGTs) on opposite sides of a bus, only a single data transceiver 202 is described. In particular, the data transceiver 202 comprises a multiplexer 203 coupling received or transmitted signals to a deserializer 204 (having a phase-locked loop (PLL) and a voltage controlled oscillator (VCO) 206) of an analog portion 207, the output of which is coupled to a multiplexer 210. The multiplexer 210 generates an output to a comma detect realignment circuit 212. An 8B/10B descrambler 214 receives the output of the comma detect realignment circuit 212. Similarly, a 64B/66B descrambler 216 receives the output of the comma detect realignment circuit 212 by way of a 64B/66B block sync circuit 218. The outputs of the 8B/10B descrambler 214 and a 64B/66B descrambler 216 are coupled to a multiplexer 220, the output of which coupled to a receiver elastic buffer 222. The receiver elastic buffer 222, which receives input from the channel bonding/clock correction block 224, generates the received data RXDATA. The data transceiver 202 also receives transmission data TXDATA which is coupled to a 64B/66B encoder 226 and a 8B/10B encoder 228, the outputs of which are coupled by a multiplexer 230 to a transmission FIFO 232. The output of the transmission FIFO 232 is coupled to a serializer 234. Serializer 234 comprises a phase-locked loop 236 having a voltage controlled oscillator 238 and generating the transmission data TXP and TXN.

Because there are many sensitive nodes within a 10 Gbps serializer/deserializer (SERDES), the analog circuits 207 are formed on the end of the data transceivers 202 and 203. For example, the input to the VCO of the SERDES PLL is sensitive to very low noise levels, where these low levels can pass easily through the substrate. By putting the SERDES on the outside column, the layout of the present invention creates physical isolation by virtue of the physical separation from the other circuits. Further, because there is not a noise source on both sides of the SERDES and thus does not create voltage potentials across the substrate running under the sensitive analog circuits of the SERDES, the layout reduces noise.

The following example illustrates that 62 microvolts of substrate noise presented to the input of the VCO at a modulation frequency of 1 MHz will generate 1 ps of jitter at the output. The transfer function of a VCO is given by:

$$H_{vco}(s) = \frac{K_0}{s},\qquad \text{EQ. 1}$$

where $K_0$ is in radians/second/volt.

At 5 Ghz (10 Gbps), one unit interval (UI) is 100 picoseconds (ps). A modulation of 1 ps is $\frac{1}{100} \cdot \pi = 0.031$ radians. The above equation uses pi instead of 2·pi because 100 ps is one half cycle. When the modulation frequency is 1 MHz, the period (p) is equal to $2 \cdot \pi \cdot 10^6$ radians/second. Accordingly, Hvco(p)= 500 radians/volt, and the voltage=0.031/500=$6.2 \times 10^{-6}$ volts. The VCO output is given by:

$$V_{VCO}(t) = V0 \cdot \sin(2 \cdot \pi \cdot 5 \cdot 10^9 \cdot t + 0.031 \cdot \sin(2 \cdot \pi \cdot 10^6 \cdot t)).\qquad \text{EQ. 2}$$

The instantaneous frequency is given by:

$$2 \cdot \pi \cdot 5 \cdot 10^9 \cdot t + 0.031 \cdot 2\pi \cdot 10^6 \cdot \sin(2 \cdot \pi \cdot 10^6 \cdot t).\qquad \text{EQ. 3}$$

The frequency of the wobble is 1 MHz, while the amplitude is $0.031 \cdot 2 \cdot \pi \cdot 10^6 = 1.948 \times 10^5$ radians/second. Therefore, the VCO frequency is shifted by 31 kHz at a 1 MHz rate.

Figure 3:
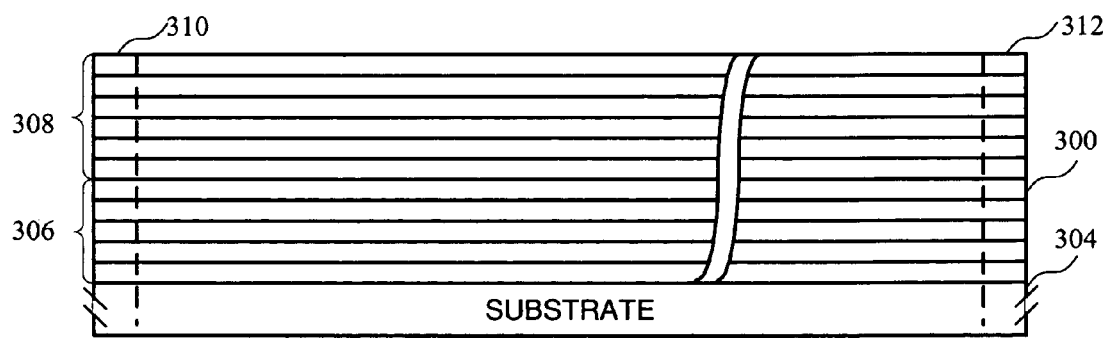
FIG. 3 is a cross section of an integrated circuit showing metal layers according to an embodiment of the present invention.

Turning now to FIG. 3, a cross section of an integrated circuit showing metal layers according to an embodiment of the present invention is shown. In particular, data transceivers of an integrated circuit 300 comprise circuit elements formed in a substrate 304, such as the circuit elements described in FIGS. 1 and 2, and a plurality of metal layers 306 and 308 coupling the circuit elements formed in the substrate. For example, the first 5 layers 306 could comprise conductors used for connecting circuit elements of the various functional blocks, such as BRAM or CLBs of a programmable logic device, while the interconnect circuits (i.e. conductors for connecting the various functional blocks) could be positioned on the upper six layers 308. Even layers of the interconnect layers could be used to route signals in a longitudinal direction, while odd layers could be used to route signals in a lateral direction. The substrate comprises circuit elements related to the data transceiver formed in the columns 310 and 312, while other circuits of a programmable logic device are formed in the substrate between columns 310 and 312.

Figure 4:
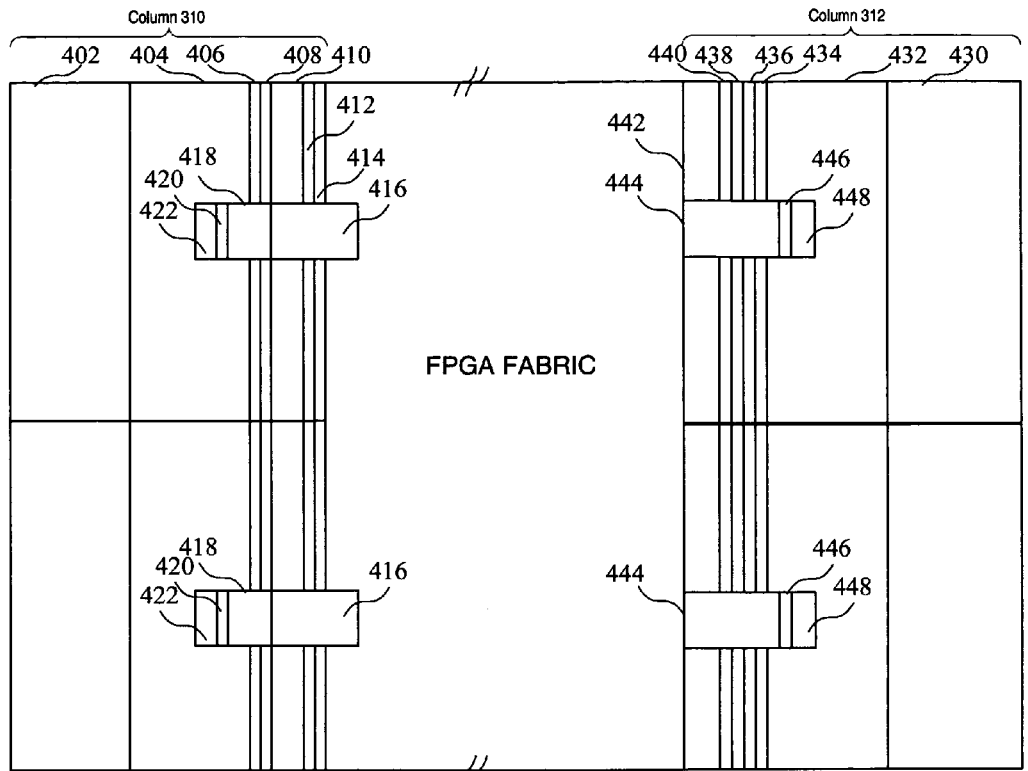
FIG. 4 is a plan view showing the arrangement of circuit elements of data transceivers according to an embodiment of the present invention.

According to one aspect of the invention, data transceivers are positioned on two ends of the integrated circuit, as shown for example by columns 310 and 312 (which will be shown in more detail in reference to FIG. 4). Because the data transceivers do not require interconnect circuits, all eleven layers in the region occupied by the data transceivers as shown could be used for the data transceivers. That is, unlike the portion of the layers having conductors for the functional blocks which are restricted to a first number of metal layers which is less than the total number of metal layers (i.e. leaving some metal layers for the interconnects between the functional blocks), the connections and buses for the data transceivers could be spread out over a greater number of layers than the first number of layers used for the functional blocks of the other parts of the circuit (e.g. all of the layers 306 and 308). Such a positioning of the data transceivers on the ends of the integrated circuit (i.e. preferably both the circuit elements formed in the substrate and some or all of the metal layers connecting the circuit elements) provides improved noise immunity, resource sharing, routing resource availability and ease of implementation, as will be described in more detail below. An example of a data transceiver could be for example a RocketPHY 10 Gbps serial data transceiver available from Xilinx, Inc., San Jose, Calif.

Turning now to FIG. 4, a plan view shows an arrangement of circuit elements of data transceivers according to an embodiment of the present invention. In particular, column 310, which shows the layout of an MGT pair, comprises a physical media attachment (PMA) sub-column 402 which comprises analog circuits for transmitting and receiving data. Because the analog circuits are generally more sensitive to noise, the sub-column having analog circuit is preferably positioned on the end of column 310. A sub-column 404 comprising digital circuits is preferably positioned adjacent to the sub-column having the analog circuits. A plurality of interconnect sub-columns are also positioned inside of the sub-columns of digital circuits. In particular, the interconnect sub-columns comprise a dynamic MCs column 406, an initial term column 408, an interconnect column 410, an interface column 412, and a route inverter column 414. Finally, an HCLK region 416, an empty space 418, an HCLK termination region 420 and a dynamic controller 422 enable the transfer of clock signals across the columns of the first MGT. Similar HCLK regions enabling the transfer of clock signals across the columns of the second MGT are also shown. The arrangement of circuits in FIG. 4 applies to both circuit elements formed in the substrate as well as conductors on the metal layers associated with the various circuits of the data transceivers. Although there will be conductors of metal layers extending between the various columns providing signals between circuits of the columns, there will generally be fewer metal layers over the analog circuit elements of the substrate because the analog circuits elements are on the end.

According to another aspect of the invention, columns having analog and digital circuits are preferably "mirrored" on the other side of the integrated circuit. That is, a second set of columns is provided on the other side of the FPGA fabric which generally provides the circuits for implementing an FPGA as described in reference to FIG. 2. Column 312 comprises another column of analog circuits 430 positioned on the end of the integrated circuit, and a column of digital circuits 432 positioned inside of the analog circuits. A plurality of interconnect sub-columns are also positioned inside of the sub-columns of digital circuits of column 312. It should be noted that while the digital and analog circuit columns are preferably mirrored (i.e. the analog circuit on the outside and the digital circuit on the inside), the interface columns are preferably not mirrored. The interface columns are formed in any order as needed. In particular, the interconnect sub-columns of column 312 as shown comprise a route inverter column 434, a dynamic MCs column 436, an initial term column 438, an interface column 440, and an interconnect column 442. Finally, an HCLK region 444, an HCLK termination region 446 and a dynamic controller 448 enable the transfer of clock signals across the columns. While FIG. 4 shows two data transceivers pairs in the two columns 310 and 312, additional MGT pairs could be employed above and below the data transceivers according to the present invention. The two data transceiver pairs are merely shown by way of example.

Figure 5:
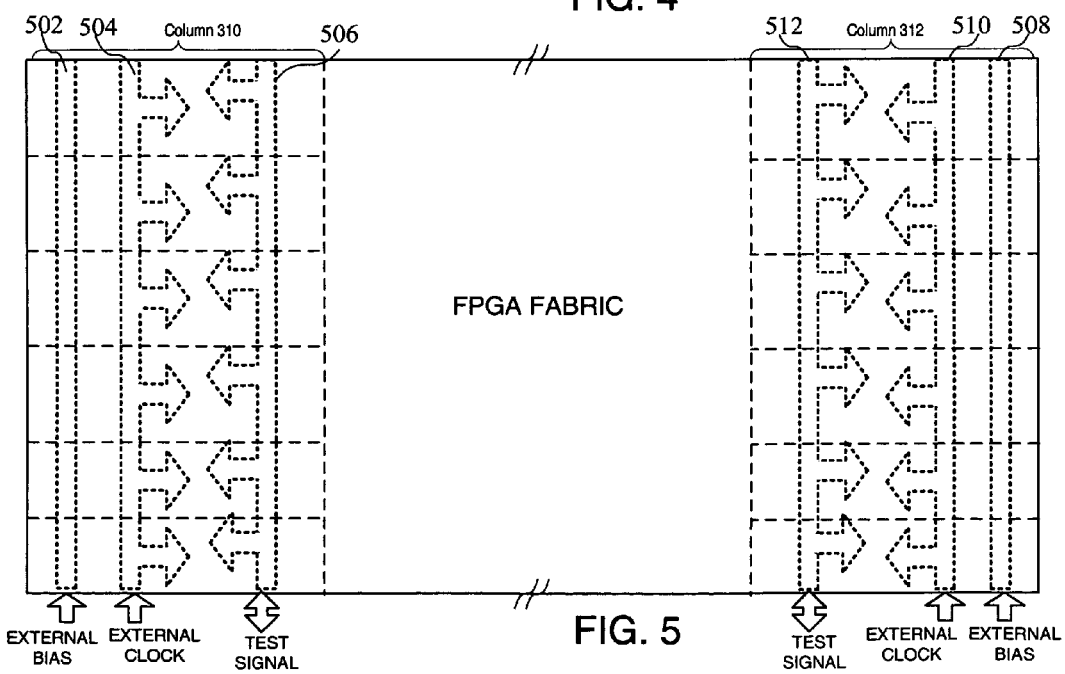
FIG. 5 is a plan view showing the arrangement of buses in a region occupied by data transceivers according to an embodiment of the present invention.

Turning now to FIG. 5, a plan view shows the arrangement of buses in a region occupied by data transceivers according to an embodiment of the present invention. According to another aspect of the invention, because interconnect circuits are not required in the columns having data transceivers as they are in portions of the FPGA fabric having functional blocks, it is possible to easily include various buses extending between the data transceivers. For example, an external bias could be applied to the integrated circuit and routed between pairs of data transceivers by way of an external bias bus 502. Similarly, an external clock could be coupled to a vertical clock bus 504 to couple clock signals from an external clock, or a clock provided by an HCLK row, for example. The vertical clock bus could also be coupled to the FPGA fabric. Finally, test signals could be coupled to a test bus 506, and routed between the data transceivers pairs. A similar external bias bus 508, external clock bus 510 and test signal bus 512 could be employed in the column 312. The buses could be positioned in any layers of the columns 310 and 312. Similarly, the circuits for the data transceivers could be positioned within the buses in as many layers of 306 and 308 as necessary.

Figure 6:
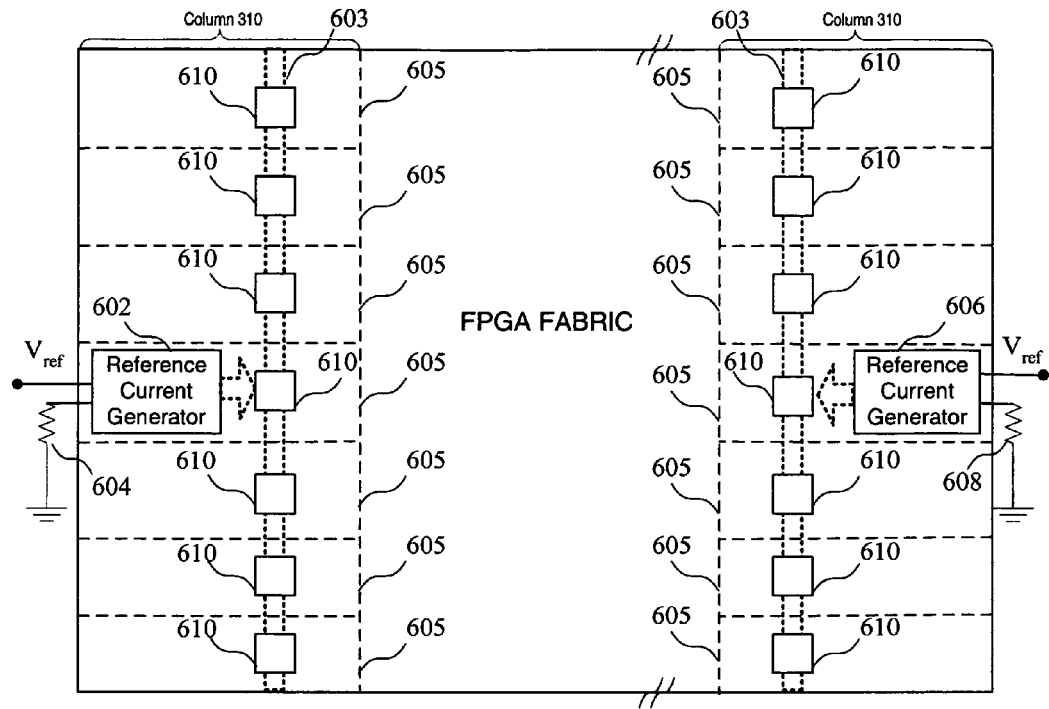
FIG. 6 is a block diagram showing a circuit for generating a bias current for a plurality of data transceiver according to an embodiment of the present invention.

Turning now to FIG. 6, a block diagram shows a circuit for generating a bias current for a plurality of data transceivers according to an embodiment of the present invention. In particular, a reference current generator 602 is coupled to receive an external reference voltage and is coupled to an external resistor 604. As will be described in more detail in reference to FIG. 7, the reference current generator 602 couples a reference current to the external bias bus 603, for example, bus 502/508 in FIG. 5, for coupling the reference current to the adjacent data transceivers 605. The data transceivers 605 could be pairs of data transceivers as shown in FIG. 2, for example, or some other suitable circuit. The reference current could comprise a fixed bias current or a variable bias current, or as will be described in more detail below, both a fixed and variable reference current could be generated. A corresponding reference current generator 606 associated with the data transceivers of the other column of data transceivers is also provided. A voltage reference and an external resistor 608 could also be coupled to the reference current generator 606. A reference current generated by a reference current generator, such as reference current generator 602 or 606, is coupled to a bias current switch circuit 610. The bias current switch circuits 610 enable coupling of the bias currents between adjacent data transceiver pairs, as will be described in more detail in reference to FIGS. 8-10. Although each bias current switch 610 is associated with a data transceiver, the bias current switches could be employed with pairs of data transceivers or some other number of data transceivers.

Figure 7:
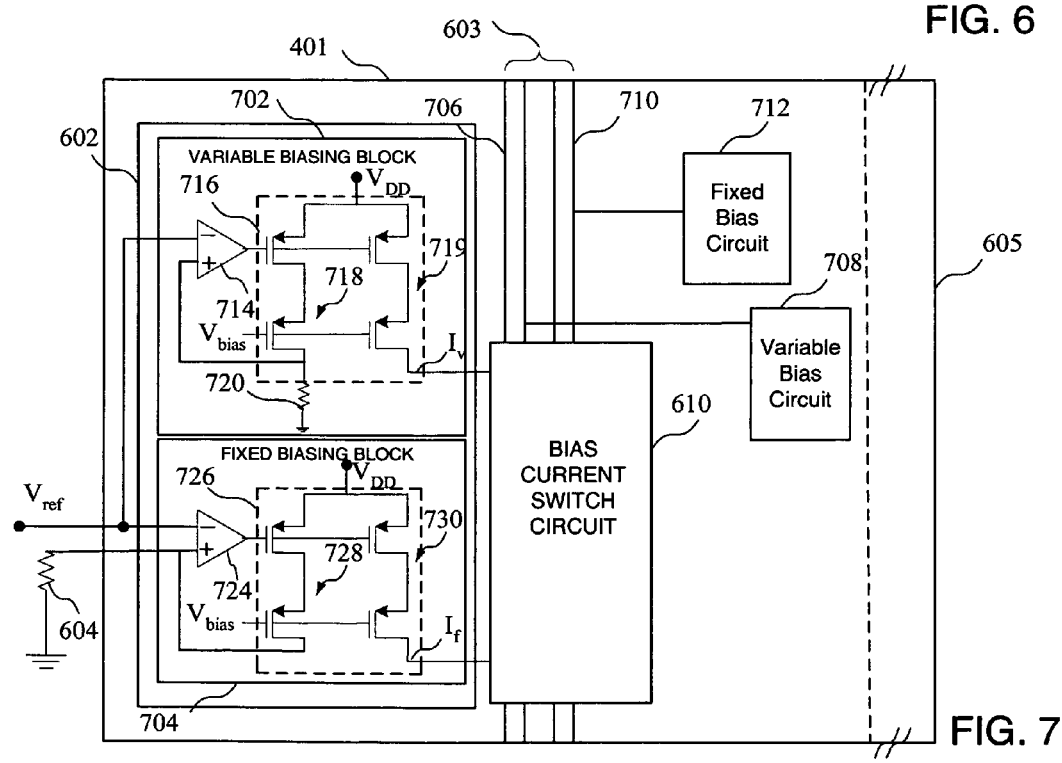
FIG. 7 is a block diagram of a reference current generator according to an embodiment of the present invention.

Turning now to FIG. 7, a block diagram of a reference current generator according to an embodiment of the present invention is shown. In particular, reference current generator 602 and a corresponding switching circuit and buses are shown in more detail. The reference current generator preferably comprises a variable biasing block 702 and a fixed biasing block 704. The variable biasing block 702 generates a variable bias current $I_v$ coupled to a variable current bus 706 which is adapted to route the variable bias current to adjacent data transceiver pairs, as will be described in more detail in reference to FIGS. 8-10. The variable bias current could also be coupled to variable bias circuits 708. Similarly, the fixed biasing block 704 generates a fixed bias current $I_f$ coupled to a fixed bias bus 710 which is adapted to route the fixed bias current to adjacent data transceiver pairs, as well as fixed bias circuits 712.

The variable biasing block 702 comprises a op-amp 714 coupled to a current mirror 716 having a first stage 718 and a second stage 719. The op-amp 714 receives the reference voltage ($V_{ref}$) at a first input and a voltage at an internal resistor 720. Because the value of the internal resistor 720 varies as a function of a polysilicon layer of the integrated circuit, the variable current $I_v$ generated by the second stage of the current mirror varies based upon variations in the resistance of internal resistor 720. The variable current is also coupled to variable bias circuits 708 comprising circuits which require the variable current $I_v$. Similarly, the fixed biasing block 704 comprises a op-amp 724 coupled to a current mirror 726 having a first stage 728 and a second stage 730. The op-amp 724 receives the reference voltage ($V_{ref}$) at a first input and a voltage based upon the external resistor 604. Because the external resistor 604 preferably comprises a high tolerance resistor, the fixed current $I_f$ generated by the second stage 730 of the current mirror is stable and not effected by process variations of the integrated circuits. Accordingly, the fixed current $I_f$ is coupled to fixed bias circuits 712 comprising circuits which require a fixed current. Although reference current generator 602 is shown in detail, it should be understood that the circuits described in FIG. 7 could also be employed in the corresponding reference current generator 606 for the data transceivers on the right column of FIG. 6.

Turning now to FIG. 8 is a block diagram of a circuit for routing bias currents according to an embodiment of the present invention. In particular, a plurality of bias switching circuits shows how fixed and variable bias currents can be coupled to adjacent data transceivers. For example, a master data transceiver 802 is coupled to receive a fixed current and a variable current, such as the fixed current and variable current generated by the circuits of FIG. 7. That is, the circuit of FIG. 7 could be used to generate the fixed and variable currents $I_f$ and $I_v$, which is coupled to a bias switching circuit 610 of the master data transceiver 802. The bias switching circuit 610 of the master data transceiver 802 could be coupled to a "south" slave data transceiver 804, a "local" data transceiver 806 or a "north" data transceiver 808. That is, the bias switching circuits 610, which will be described in more detail in reference to FIG. 9, enable the fixed and variable currents $I_f$ and $I_v$ to be propagated to adjacent data transceivers.

Turning now to FIG. 9 is a block diagram of a circuit for coupling bias currents to adjacent data transceivers according to an embodiment of the present invention. In particular, bias switching circuit 610 comprises a variable bias replica block 902 coupled to the variable current bus 706. The variable bias replica block 902 comprises a current amplifier and is coupled to the variable current bus 706 by way of a south variable current switch $S_v$ and a north switch $N_v$. A variable transfer switch $T_v$ is also positioned in the variable bias bus for coupling the variable current $I_v$ between the data transceivers. Depending upon whether the bias switching circuit 610 is associated with a master data transceiver 802, a "south" slave data transceiver 804, a "local" data transceiver 806, or a "north" data transceiver 808, the switches of the bias switching circuit are selected to properly route the variable current $I_v$ to its data transceiver or an adjacent data transceiver. The table of FIG. 10 shows switch settings and input/output functions for the various circuits of FIG. 8 for coupling bias currents. Similarly, a fixed bias replica block 904 is coupled to the fixed bias bus 710 by way of a south fixed current switch $S_f$ and a north fixed current switch $N_f$. A fixed current transfer switch $T_f$ is also positioned in the fixed bias bus for coupling the fixed current $I_f$ between the data transceivers. As is also shown, a local fixed current $I_{localf}$ and local variable $I_{localv}$ current, which are coupled to circuits of the data transceivers requiring either a fixed or variable current, are also generated by the variable bias replica block 902 and the fixed bias replica block 904, respectively.

Turning now to FIG. 11, a flow chart shows a method of generating a bias current according to an embodiment of the present invention. The method of FIG. 11, as well as the methods of FIGS. 12-14 described below, could be implemented using the circuits of FIGS. 1-9, or other suitable circuits. In particular, a plurality of data transceivers is provided in a column at a step 1102. The data transceivers could be configured as pairs of MGTs described in reference to FIG. 2. The column of data transceivers is positioned in columns on an end of an integrated circuit, as shown for example in FIGS. 3-7, at a step 1104. A bus is provided in the region occupied by the plurality of data transceivers at a step 1106. That is, the bus is provided on a layer in the column where the data transceivers are formed. An external voltage is coupled to a first data transceiver at a step 1108. A first bias current based upon the external voltage is generated at a step 1110. The current could be generated by the reference current generator 602 of FIG. 7, and could generate either a fixed current or a variable current. The first bias current from the first data transceiver is coupled to a plurality of data transceivers by way of a bus, as described for example in FIGS. 8-10, at a step 1112.

Turning now to FIG. 12, a flow chart shows a method of coupling bias currents according to an embodiment of the present invention. In particular, a plurality of data transceivers is provided in a column at a step 1202. The column of data transceivers is positioned on an end of an integrated circuit at a step 1204. A bus is provided on adjacent layers in the region occupied by the plurality of data transceivers at a step 1206. A data transceiver is designated as a master data transceiver at a step 1208. The remaining data transceivers are designated as slave transceivers at a step 1210. A first reference current generated in the master data transceiver is coupled to the plurality of slave data transceivers at a step 1212. Accordingly, by employing one data transceiver as a master and routing a current generated by the master to a plurality of slave data transceivers, a stable bias current can be routed to a plurality of data transceivers without employing external pins for each data transceivers.

Figure 13:
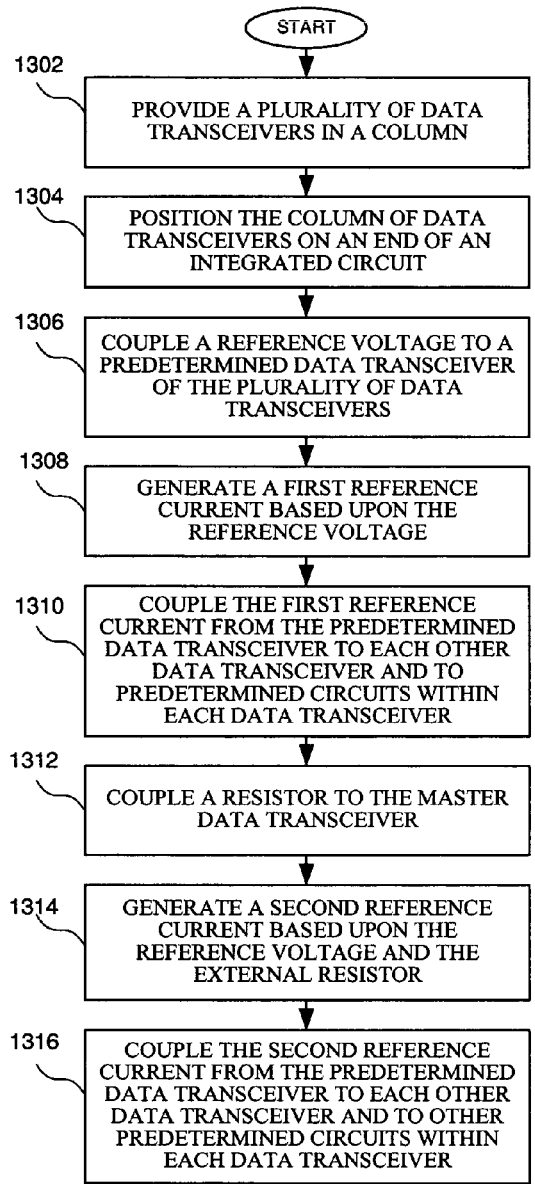
FIG. 13 is a flow chart showing a method of coupling first and second bias currents to predetermined circuits according to an embodiment of the present invention.

Turning now to FIG. 13, a flow chart shows a method of coupling first and second bias currents to predetermined circuits according to an embodiment of the present invention. According to another aspect of the invention, fixed and variable bias currents can be generated based upon an external applied voltage, and routed to predetermined circuits requiring either a fixed current or a variable current. In particular, a plurality of data transceivers is provided in a column at a step 1302. The column of data transceivers is positioned on an end of an integrated circuit at a step 1304. A reference voltage is coupled to a master data transceiver of the plurality of data transceivers at a step 1306. A first reference current, which is a variable current based upon the reference voltage and an internal resistor, is generated at a step 1308. The first reference current from the master data transceiver is coupled to each other data transceiver and to predetermined circuits within each data transceiver at a step 1310. A resistor is also coupled to the master data transceiver at a step 1312. A second reference current based upon the reference voltage and the external resistor is generated at a step 1314. The second reference current, which is a fixed reference current, is coupled from the predetermined data transceiver to each other data transceiver and to other predetermined circuits requiring a fixed current within each data transceiver at a step 1316. The fixed and variable currents could be generated for example by the circuits of FIG. 7, and routed to data transceivers as described in reference to FIGS. 8-10.

Figure 14:
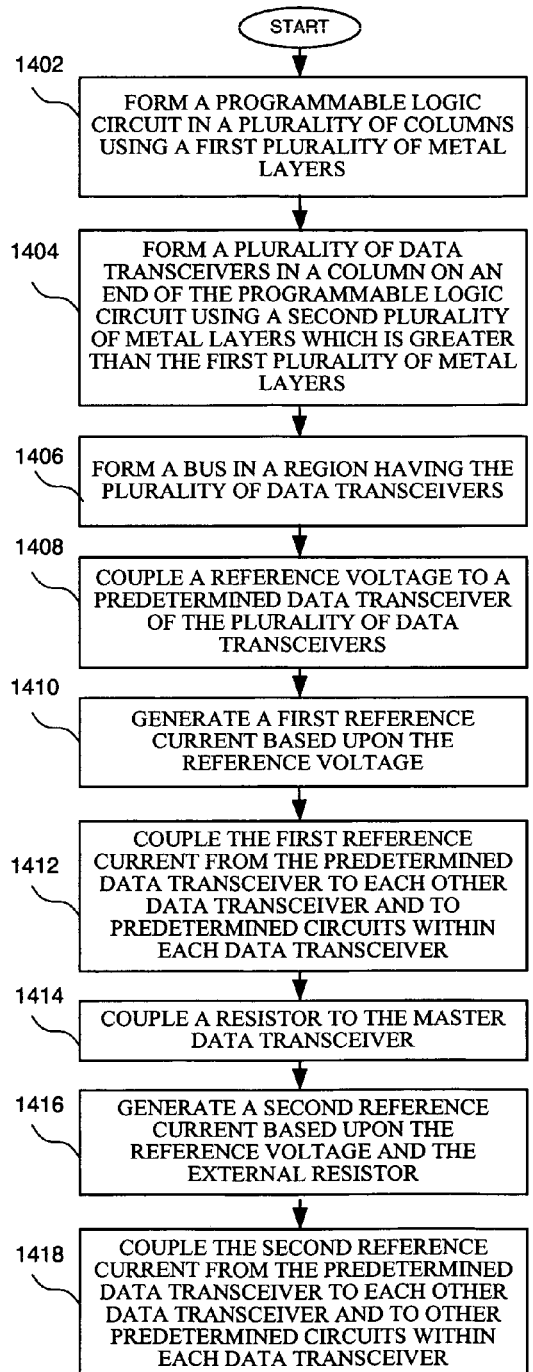
FIG. 14 is a flow chart showing a method of forming an integrated circuit enabling coupling bias currents between data transceivers according to an embodiment of the present invention.

Turning now to FIG. 14, a flow chart shows a method of forming an integrated circuit enabling coupling bias currents between data transceivers according to an embodiment of the present invention. In particular, programmable logic circuits are formed in a plurality of columns using a first plurality of metal layers at a step 1402. Interconnect circuits are formed on layers adjacent to the layers comprising the programmable logic circuits. For example, the first five layers could include conductors for implementing the various functional blocks comprising a programmable logic portion, such as BRAMs or CLBs of a programmable logic device, while the interconnect circuits could be positioned on the upper six layers. Certain layers of the interconnect layers could be used to route signals in a longitudinal direction, while the remaining layers could be used to route signals in a lateral direction. A plurality of data transceivers is formed in a column on an end of the programmable logic circuit using a second plurality of metal layers which is greater than the first plurality of metal layers at a step 1404. A bus is formed in a region having the plurality of data transceivers at a step 1406. A reference voltage is coupled to a predetermined data transceiver, such as a master data transceiver, of the plurality of data transceivers at a step 1408. A first reference current based upon the reference voltage is generated at a step 1410. The first reference current is coupled from the predetermined data transceiver to each other data transceiver and to predetermined circuits within each data transceiver at a step 1412. An external resistor is coupled to the master data transceiver at a step 1414. A second reference current, comprising a fixed reference current, based upon the reference voltage and the external resistor is generated at a step 1416. The second reference current is coupled from the predetermined data transceiver to each other data transceiver and to other predetermined circuits within each data transceiver at a step 1418. The integrated circuit comprising the data transceivers could be, for example, the circuits of FIGS. 2-9, and implemented in the circuit arrangement of FIG. 1. However, it should be understood that other circuits for implementing the methods of FIG. 14, as well as methods of FIGS. 11-13, could be employed.

It can therefore be appreciated that the new and novel integrated circuit and method of generating a bias current for a plurality of data transceivers has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. An integrated circuit having a plurality of data transceivers, said integrated circuit comprising:
a reference voltage;
a first data transceiver receiving said reference voltage;
a plurality of data transceivers coupled to said first data transceiver, each data transceiver of said plurality of data transceivers receiving a reference current from said first data transceiver, said reference current being based upon said reference voltage;
a current mirror associated with each said data transceiver, said current mirror propagating said reference current; and
a plurality of switches coupled to each said current mirror, said plurality of switches enabling the configuration of each said data transceiver in either a master mode or a slave mode.

2. The integrated circuit of claim 1 wherein said plurality of switches coupled to said current mirror associated with said first data transceiver couples said reference current to said plurality of data transceivers.

3. The integrated circuit of claim 1 wherein each said data transceiver configured in a slave mode receives said reference current from an adjacent data transceiver.

4. An integrated circuit having a plurality of data transceivers, said integrated circuit comprising:
   a reference voltage;
   a master data transceiver receiving said reference voltage and generating a reference current based upon said reference voltage; and
   a plurality of slave data transceivers coupled to said master data transceiver, each said slave transceiver receiving said reference current from said master data transceiver; and
   current mirrors associated with said master data transceiver and said plurality of slave data transceivers, said current mirrors propagating said reference current.

5. The integrated circuit of claim 4 wherein said master data transceiver and said slave data transceivers are arranged in a column.

6. The integrated circuit of claim 5 wherein said master data transceiver comprises a switching circuit for outputting a reference current to an adjacent data transceiver.

7. The integrated circuit of claim 5 wherein each slave transceiver of said plurality of slave transceivers comprises a switching circuit for receiving said reference current from an adjacent data transceiver.

8. The integrated circuit of claim 4 further comprising a data bus coupling each said data transceiver to an adjacent data transceiver and enabling the coupling of said reference current between said data transceivers.

9. An integrated circuit having a plurality of data transceivers, said integrated circuit comprising:
   a reference voltage coupled to a first node;
   an external resistor coupled to second node;
   a master data transceiver receiving said reference voltage, said master data transceiver comprising a fixed biasing block generating a fixed reference current based upon said reference voltage and said external resistor, and a variable biasing block generating a variable reference current based upon said reference voltage; and
   a plurality of slave data transceivers coupled to said master data transceiver, each said slave data transceiver of said plurality of slave data transceivers receiving said fixed reference current and said variable reference current from said master data transceiver.

10. The integrated circuit of claim 9 wherein said master data transceiver and said plurality of slave data transceivers are arranged in a column.

11. The integrated circuit of claim 10 further comprising a bus coupling each said slave data transceiver to said mater data transceiver.

12. The integrated circuit of claim 9 further comprising a first plurality of circuits coupled to receive said fixed reference current.

13. The integrated circuit of claim 12 further comprising a second plurality of circuits coupled to receive said variable reference current.

14. An integrated circuit having a plurality of data transceivers, said integrated circuit comprising:
   a first plurality of data transceivers positioned in a column on a first end of said integrated circuit and having a master data transceiver and a plurality of slave data transceivers;
   a reference voltage coupled to said master data transceiver;
   a reference current generated by said master data transceiver; and
   a bus coupling said master data transceiver to said plurality of slave data transceivers,
   wherein said reference current comprises a variable reference current which varies based upon the resistance of a polysilicon layer of said integrated circuit.

15. The integrated circuit of claim 14 further comprising an external resistor coupled to said master data transceiver.

16. The integrated circuit of claim 15 wherein said master data transceiver generates a fixed reference current based upon said reference voltage and said external resistor.

17. The integrated circuit of claim 14 further comprising a second plurality of data transceivers positioned in a column on a second end of an integrated circuit.

18. A method of generating a bias current for a plurality of data transceivers, said method comprising the steps of:
   positioning said plurality of data transceivers in a column;
   coupling a reference voltage to a first data transceiver of said plurality of data transceivers;
   generating a first bias current based upon said reference voltage; and
   coupling, using a switch that configures said first data transceiver in either a master mode or a slave mode, said first bias current from said first data transceiver to the other data transceiver of said plurality of data transceivers.

19. The method of claim 18 further comprising a step of coupling an external resistor to said first data transceiver.

20. The method of claim 19 further comprising a step of generating a second bias current based upon said reference voltage and said external resistor.

21. The method of claim 18 wherein said step of positioning said plurality of data transceivers in a column comprises a step of positioning said plurality of data transceivers in a column on an end of said integrated circuit.

22. The method of claim 21 further comprising a step of providing a bus between said plurality of data transceivers.

23. A method of generating a bias current for a plurality of data transceivers, said method comprising the steps of:
   providing a master data transceiver;
   coupling a plurality of slave data transceivers to said master data transceiver by way of a bus; and
   coupling, using switches that configure said data transceivers in either a master mode or a slave mode, a first reference current generated in said master data transceiver to said plurality of slave data transceivers.

24. The method of claim 23 further comprising a step of coupling a resistor to said master data transceiver, wherein said first reference current comprises a fixed reference current based upon said reference voltage and said resistor.

25. The method of claim 24 further comprising a step of generating a second reference current based upon said reference voltage and an internal resistor.

26. The method of claim 23 further comprising a step of arranging said master data transceiver and said plurality of slave data transceivers in a column.

27. The method of claim 26 wherein said step of coupling a first reference current comprises providing a bus between said master data transceiver and said plurality of slave data transceivers.

28. A method of generating a bias current for a plurality of data transceivers, said method comprising the steps of:
   providing a plurality of data transceivers in a column;
   coupling a reference voltage to a predetermined data transceiver of said plurality of data transceivers;
   generating a first reference current based upon said reference voltage; and
   coupling, using switches that configure said plurality of data transceivers in either a master mode or a slave mode, said first reference current from said predetermined data transceiver to each other data transceiver.

29. The method of claim 28 wherein said step of providing a plurality of data transceivers in a column comprises a step of providing a plurality of data transceivers in a column on an end of a programmable logic device.

30. The method of claim 28 further comprising a step of coupling an external resistor to said predetermined data transceiver.

31. The method of claim 30 further comprising a step of generating a second reference current based upon said reference voltage and said external resistor.

32. The method of claim 31 further comprising a step of coupling said second reference current from said predetermined data transceiver to each other data transceiver.

\* \* \* \* \*